United States Patent [19]

Hamada et al.

[11] Patent Number: 4,891,653

[45] Date of Patent: Jan. 2, 1990

[54] IMAGE RECORDER WITH MICROSTEP DRIVEN MOTOR TRANSPORT

[75] Inventors: Akiyoshi Hamada; Mitsutoshi Yagoto, both of Osaka, Japan

[73] Assignee: Minolta Camera Kabushiki Kaisha, Osaka, Japan

[21] Appl. No.: 185,904

[22] Filed: Apr. 25, 1988

[30] Foreign Application Priority Data

Apr. 27, 1987 [JP] Japan .................. 62-103781
Apr. 27, 1987 [JP] Japan .................. 62-103782

[51] Int. Cl.⁴ .................. G01D 15/24; G01D 15/14; H04N 1/23
[52] U.S. Cl. .................. 346/108; 358/296
[58] Field of Search .................. 346/107 R, 108, 160, 346/76 L; 358/296, 300, 302

[56] References Cited

U.S. PATENT DOCUMENTS

| 4,257,053 | 3/1981 | Gilbreath | 346/108 |
| 4,307,408 | 12/1981 | Kiyohara | 346/108 |
| 4,573,059 | 2/1986 | Shinma et al. | 346/106 |
| 4,598,300 | 7/1986 | Ono | 346/106 |

FOREIGN PATENT DOCUMENTS 57-193170  11/1982  Japan .
59-116748  7/1984  Japan .

Primary Examiner—B. A. Reynolds
Assistant Examiner—Mark Reinhart
Attorney, Agent, or Firm—Burns, Doane, Swecker & Mathis

[57] ABSTRACT

An image forming apparatus for forming in series a plurality of images on a photosensitive film of the long roll type having a film transporting mechanism using a stepping motor, a microstep driver for controllably driving the stepping motor in a plurality of microsteps constituting one step unit of the stepping motor and an imaging device for forming an image on the film being transported by the film transporting mechanism. According to this image forming apparatus, variations in the film transport start positions resulting from the microstep-wise drive are avoided either by the film transporting mechanism arranged such that a pitch between adjacent images to be formed in series on the film is a multiple of an integer of a film transport distance covered by the single step unit of the stepping motor, or by an initial control device for re-setting the stepping motor to a stop position thereof assumed at completion of a previous imaging operation before re-energizing the stepping motor for a next imaging operation.

4 Claims, 6 Drawing Sheets

IMAGE RECORDER WITH MICROSTEP DRIVEN MOTOR TRANSPORT

BACKGROUND OF THE INVENTION (1) Field of the Invention

The present invention relates to an image forming apparatus for recording image information by means of laser beam irradiation on a film of the long roll type being transported by drive of a stepping motor.

(2) Description of Related Art

There is known an image forming apparatus of the above-noted type comprising a housing, a film delivery section for a film of the roll type placed inside the housing, a film accommodating section disposed in the housing for forming a film transport passage together with the film delivery section, a main drive unit disposed on the film transport passage in the housing and for driving the film at a fixed speed and an image information recording section constituted by a laser optical unit for applying a laser beam onto the film in a width direction of the film being driven and transported by the main drive unit. The main drive unit includes a stepping motor and a platen roller driven by the motor for transporting the film contacting an outer circumferential face of the roller.

In the image forming apparatus constructed as above, two-dimensional images are formed in series on the long-length film by a laser beam scanning operation in the film is width direction while the film being transported.

In order for the above apparatus to obtain an image of good quality, it is essential that the film transport operation be carried out at a constant and equal speed. According to one known arrangement attempting to meet this requirement, which is shown in FIG. 10, there is provided a microstep driver for sub-dividing one step unit of the stepping motor powered ON and OFF by a CPU into smaller (micro) step units, thereby minimizing such transport irregularities or errors.

The stepping motor employed in the above-described conventional image forming apparatus has an inherent disadvantage to be described next. That is, the stepping motor is in a magnetically balanced, i.e., stable state when one of its rotor pairs is opposed to a stator. Thus, if a predetermined amount of film transport is completed in the middle of one-step rotation of the stepping motor, there occurs a magnetic instability such that either pair of the rotors will stop only after automatically proceeding or receding in its rotation to become opposed to the stator in order to regain the stability. Therefore, if the stepping motor is re-energized for the next film transport, this film transport operation is inadvertently carried out from the above-noted stabilized position of the motor which has shifted from the previous position assumed by the motor before being re-energized. However, if an image is formed on a long-length film as used e.g. in a page printer, its frame pitch must be maintained exactly constant. In such case, the stepping motor is disadvantageous because of its above-noted instability which necessarily results in inconsistency in the frame pitch. This problem appears conspicuously in the case of a microfilm where an image is recorded in micron unit precision to be enlarged for use thereafter.

Next, the frame pitch will be defined. As shown in FIG. 9, images are formed in series in respective adjacent frames F on the film. The frame pitch P is defined here as a pitch between an adjacent pair of frames, i.e.,a distance: P from a leading edge of one frame to a leading edge of the adjacent frame next in order in the direction in which the film is transported.

SUMMARY OF THE INVENTION

The primary object of the present invention is to provide an image forming apparatus using a stepping motor driven microstep-wise as film transport means, the apparatus being capable of forming images on a film with an accurately constant frame pitch.

The foregoing object is accomplished in one embodiment by providing film transport means driven by the stepping motor, the transport means being constructed such that the frame pitch of the images to be formed on the film is a multiple of an integer of a film transport distance covered by one step amount of the drive provided by the stepping motor.

According to the above construction, when the stepping motor is stopped after completion of a predetermined amount of film transport, one of the rotor pairs is always placed in the magnetically stable state as being opposed to and attracted by the stator. Thus, there is no possibility that the predetermined amount of film transport operation is stopped in the middle of one step rotational unit of the motor. As the result, the leading edge of the image to be formed next is always placed at the predetermined leading edge of the frame pitch.

The foregoing object is also accomplished in another embodiment by initial control means for the stepping motor. This initial control means operates to set the stepping motor to the stop position previously assumed by the motor at completion of the foregoing imaging operation before the stepping motor is re-energized for a subsequent imaging operation.

According to this arrangement, when one imaging, i.e., one frame imaging operation is completed in the middle of one step rotation of the stepping motor, as described hereinbefore, the stepping motor is stopped only after proceeding or receding in its rotation to a position where either pair of rotors is opposed to the stator. However, with the above-noted arrangement, the stepping motor is to be re-energized after the initial control means returns the motor to the previous microstep drive stop position. As a result, when starting the next imaging operation after completion of one imaging operation, the leading edge of the next image is always placed at the predetermined leading edge of the frame pitch.

In this case, needless to say, a diameter of a platen roller may be predetermined freely.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Preferred embodiments of an image forming apparatus related to the present invention will be particularly described hereinafter with reference to the accompanying drawings.

(Embodiment (1))

Figure 1:
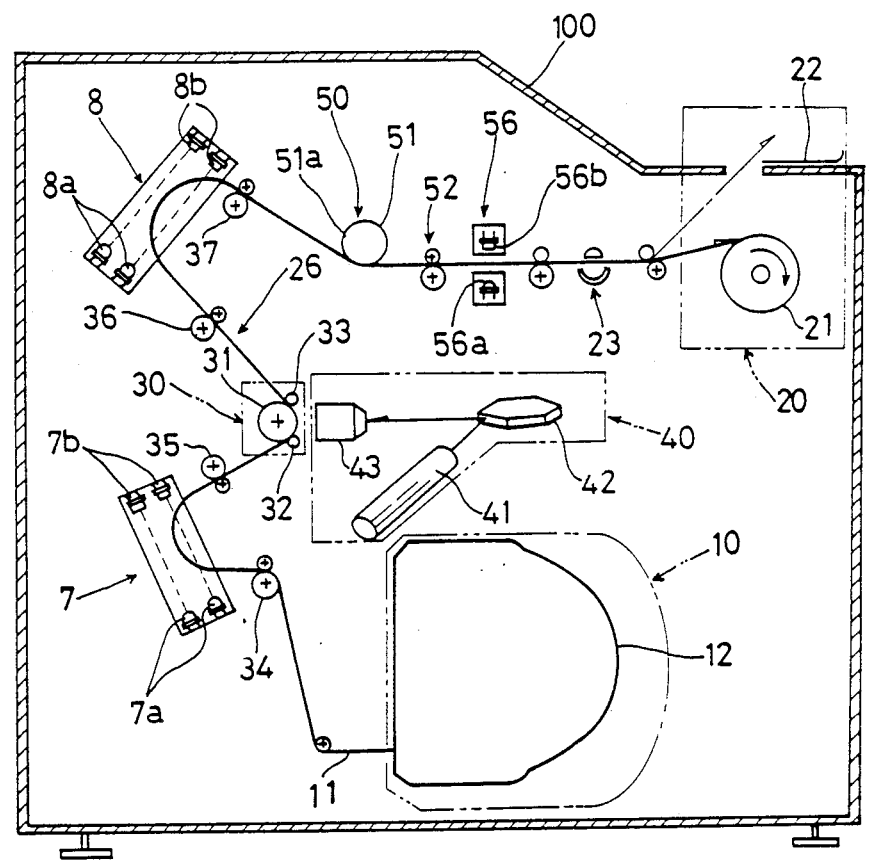
FIG. 1 is a front view showing an entire construction of an image forming apparatus related to the present invention.

An image forming apparatus according to this embodiment, as shown in FIG. 1, comprises as main components thereof a housing 100, a film delivery section 10, a film accommodating section 20, a film transport unit 30, an image information recording section 40 and a heat-developing section 50.

The housing 100 accommodating therein the film delivery section 10, a film accommodating section 20, the transport unit 30, the image information recording section 40, the heat-developing section 50 and the like, provides a dark room interior condition shut out from the external environment. Also, the housing 100 includes an openable lid for inserting a film therethrough.

The film delivery section 10 is positioned at a lower portion inside the housing and loading therein a film cassette 12 housing the film 11 of the heat-development type in a rolled-up condition thereof. As this film 11, a dry silver halide film (DAKOMATIC film (trademark) manufactured by Kodak. Co.) having a length of 170 m and a width of 16 mm is used.

The film accommodating section 20 is positioned at an upper interior portion of the housing 100 and forms a film transport passage 26 with the film delivery section 10, the film accommodating section 20 including a film take-up reel 21 positioned at an upper interior portion of the housing and a tray 22 disposed outwardly of the housing for receiving a cut-off film portion. The housing 100 further includes an unillustrated switching device for selectively advancing the film either toward the take-up reel 21 or towards the tray 22. For obtaining a cut-off film, there is also provided a cutter 23 for cutting off the film 11 being transported, and then the cut-off film is received in the tray 22.

The transport unit 30 is disposed on the film transport passage 26 at a middle interior portion of the housing 100. This transport unit 30 includes a stepping motor, a platen roller 31 driven by the stepping motor and pressing rollers 32 and 33 contacting the platen roller 31 to be driven and rotated by the same, the film 11 being transported as nipped between the platen roller 31 and the pressing rollers 32 and 33.

Figure 2:
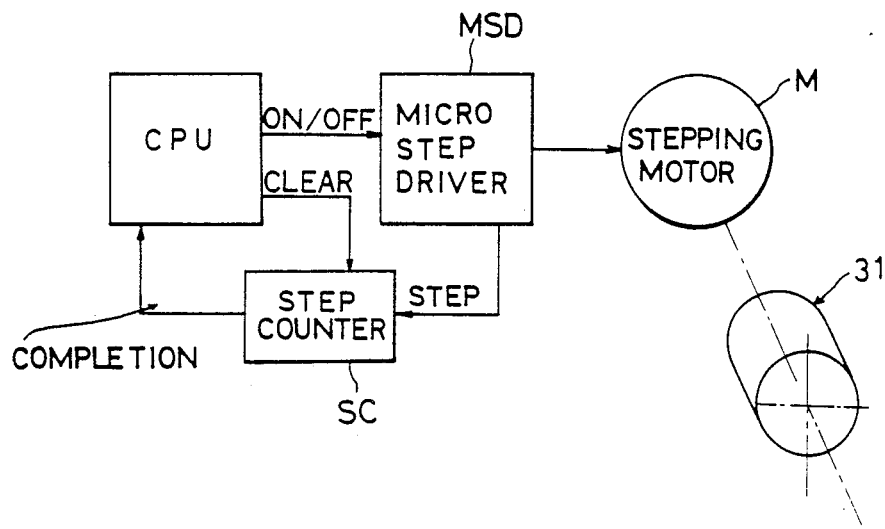
FIG. 2 is a control block diagram illustrating a control scheme for a stepping motor according to one preferred embodiment of the present invention.
Figure 3:
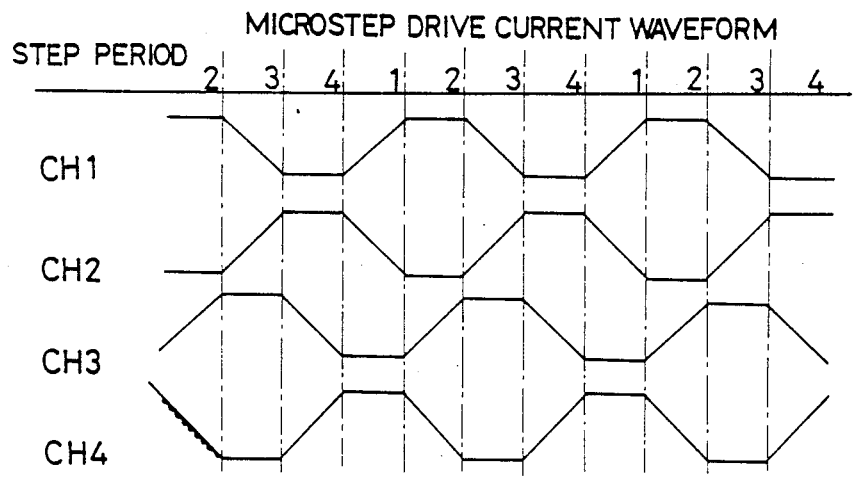
FIG. 3 is a waveform chart illustrating an output waveform generated by a microstep driver.

The stepping motor M is of the hybrid four-phase-excitation type having a step angle of 0.9 degree. In operation, as illustrated in a control block diagram of FIG. 2, this stepping motor M is controlled by a microstep driver MSD energized by an ON/OFF signal from a microcomputer CPU. The microstep driver MSD operates to drive and control the stepping motor M microstep-wise by sub-dividing one step of the stepping motor M into 1024 microsteps. FIG. 3 shows waveforms of output from this microstep driver MSD. By receiving an electric current having the above waveforms into respective channels, the stepping motor M is driven microstep-wise. Such microstep drive operation of the stepping motor is wellknown from the prior art and therefore will not be discussed here in detail. A step counter denoted by a reference mark SC in FIG. 2 counts step-like pulses generated from the microstep driver MSD to the stepping motor M and then transmits a completion signal to the microcomputer CPU after counting up a predetermined number of step pulses. The subsequent clear operation of this step counter may be executed either by a signal dedicated to command a count-clear operation transmitted from the CPU as shown or by effectively utilizing the ON/OFF signal from the CPU.

The platen roller 31 is disposed coaxially on a drive shaft of the stepping motor M to be driven by this motor M. the diameter of this platen roller 31 is set to be a multiple of an integer of one-step-unit film transport distance covered by a predetermined one frame pitch of the film 11 provided by one step amount drive of the stepping motor M. In this embodiment, this diameter R is set to be 31.831 mm obtained from the expression shown below and the frame pitch of the film 11 is set to be 10 mm. Thus, for transporting the film 11 by one frame pitch, the stepping motor M effects a drive corresponding to forty steps units.

$$R = (1/N) \times (P/\pi) \times (360/A)$$

where N is the number of steps of the stepping motor for transporting the film by one frame pitch, P is a length of the one frame pitch of the film, and A is the step angle of the stepping motor.

The platen roller 31 is disposed in a position opposed to a direction in which a portion of its outer circumferential face is irradiated by the laser beam applied from the image information recording section 40 to be described later, the above opposing position being an image-recording position. At the left and right sides of this image-recording position, there are disposed the pressing rollers 32 and 33 contacting the outer circumferential face of the platen roller 31. The film 11 having been delivered from the film delivery section 10 is transported as being pressed against an outer circumferential face of the platen roller 31 by the pressing rollers 32 and 33 while the film contacting the image-recording position.

The image information recording section 40 comprising a laser optical unit records image information by applying the laser beam to the film being transported at the image-recording position of the platen roller 31 in a width direction of the film 11 (direction being normal to the film transport direction). More particularly, this image information recording section 40 includes a laser device 41 for generating a helium neon gas laser based on predetermined image information, a rotary polygon mirror 42 effecting a line scanning operation by causing a high-speed eccentric rotation of the laser beam from the laser device 41, and a lens group 43 for forming an image at a distance proportional to an incident angle of the laser beam from the rotary polygon mirror 42.

The heat-developing section 50 heat-develops the image information recorded on the film 11 by the image information recording section 40, and is disposed inside the housing between the film transport unit 30 and the film accommodating section 20 while facing the film transport passage 26. This heat-developing section 50 includes a heating roller 51 having an outer circumferential face 51a for heating the film 11 contacting the face and a guide roller 52 for advancing the heat-developed film 11 to the film accommodating section 20.

Also, at the film feed side of the platen roller 31, there are provided a film slack detecting device 7 for detecting slacks of the film 11 being transported and feed drive rollers 34 and 35 driven as being controlled based on a detection by the film slack detecting device 7. At the film discharge side of the platen roller 31, on the other hand, there are provided, in a similar fashion as the above-described film feed side, another film slack detecting device 8 and film discharge drive rollers 36 and 37. The film slack detecting devices 7 and 8 comprise infrared light emitting diodes 7a and 8a and light receiving elements 7b and 8b, respectively.

On the film transport passage 26 between the heat-developing section 50 and the film accommodating section 20, there are provided a transport drive roller 52 and an image density detector 56 for detecting a density of the image information heat-developed on the film 11 and for adjusting an irradiation amount of the laser beam from the laser device 41 based on the detection. This image density detector 56 comprises a light emitting diode 56a and a light receiving element 56b disposed respectively on the sides across the film transport passage 26.

Next, functions of the image forming apparatus of the present invention constructed as above, will be particularly described.

The roll film 11 of the heat-developing type is preloaded in the film delivery section 10, with its leading end being extended into the film transport passage 26 to be taken up by the take-up reel 21 of the film accommodating section 20. Alternatively to this arrangement, the leading end of the film 11 may also be discharged onto the film tray 22 disposed externally of the housing by means of an appropriate switching device.

From this condition, as the image forming apparatus is powered ON, the film delivery section 10, the platen rollers 34 and 35 and the discharge drive rollers 36 and 37 are activated, whereby the film 11 having been delivered from the film delivery section 10 is advanced with a suitable slack provided by the feed drive rollers 34 and 35 to the platen roller 31. In the above operations, the slack detecting device 7 detects the amount of slack of the film 11 being transported, and based on a resultant detection signal from this device 7 the drive speed of the feed drive rollers 34 and 35 is adjusted. Then, the film 11 is transported while being urged by the pressing rollers 32 and 33 against the image-recording position on the outer circumferential face of the platen roller 31 being driven by the stepping motor. In synchronism with the above operations, the film 11 has its face opposed to the other face contacting the platen roller 31 irradiated by the laser beam from the image information recording section 40, on which face image information is recorded. In this image information recording operation, the stepping motor M drives microstep-wise the platen roller 31 through the microstep driver MSD. When the platen roller 31 has transported the film 11 by one-frame unit length (10 mm), the stepping motor M has rotated by exactly 40 steps units. As the result, when the film 11 has been transported by a predetermined amount, either pair of the rotors of the stepping motor is always stopped at a position opposed to as being attracted by the stator. Accordingly, the rotor pair is not moved inadvertently after completion of predetermined amount of transportation of the film 11, and the leading edge of the next frame to be formed with a subsequent drive of the stepping motor is always placed at the predetermined leading edge position of the frame pitch. Thereafter, the film 11 having its face recorded with the image information is discharged through the platen roller 31 while being provided with an appropriate slack by the discharge drive rollers 36 and 37 controllably driven by the slack detecting device 8, then the film 11 is fed to the heat-developing section 50, where the film 11 is heat-developing as its face opposite to the face recorded with the image information through the foregoing laser beam irradiation being heated by the heating roller 51 of the heat developing section 50. This heat-developed film 11 then undergoes an image density detection by the image density detector 50 and is transported by the transport roller into the film accommodating section 20.

As described above, according to the image forming apparatus of this embodiment of the present invention, it is possible not only to transport the film 11 with a high precision but also to maintain the frame pitch exactly constant.

Further, if a step counter is provided to the control section for the stepping motor, it is possible to achieve the above effect without significantly modifying the prior art apparatus.

Also, as described hereinbefore, the main drive roller 31 transports, for feeding or discharging, the film 11 being provided with an appropriate slack. Therefore, the roller 31 is not subjected to any tensile force from the film 11 and thus achieves a stable rotational speed for driving.

(Modified Embodiment)

Figure 4:
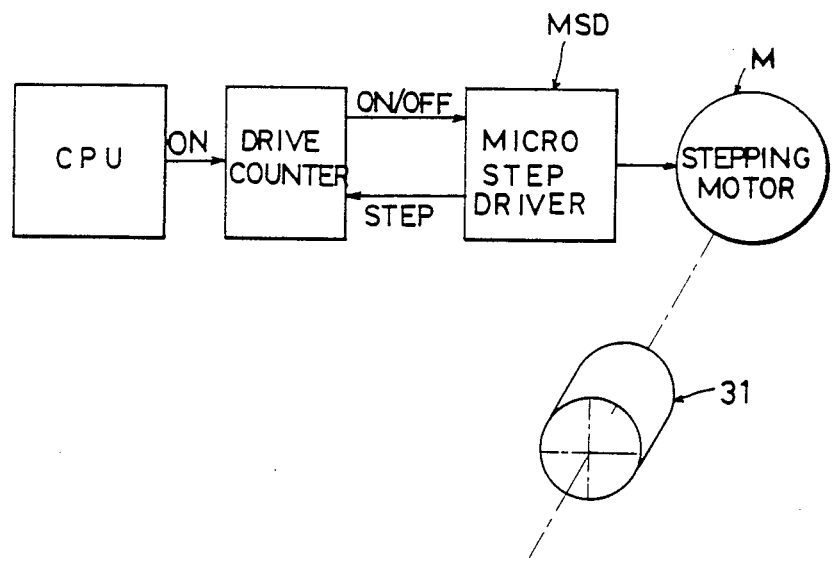
FIG. 4 is a control block diagram illustrating a modified control scheme for the stepping motor alternative to that illustrated in FIG. 2.

In this modified embodiment, the control section for controlling the stepping motor includes a drive counter in place of the step counter used in the previous embodiment. In this case, referring to FIG. 4 showing its control block, the drive counter is set to drive the microstep driver by 40 steps (N) in response to an input of an ON signal from the CPU.

The image forming apparatus of this modified embodiment is advantageous in that the CPU is less burdened with operations than that of the apparatus of the previous embodiment while achieving the same effect as the latter.

More particularly, in the case of the image forming apparatus by this modified embodiment, the platen roller has such a diameter that the predetermined one frame unit film transport distance is a multiple of an integer of the stepwise transport distance covered by one step amount rotation of the stepping motor. As the result, when a predetermined amount of film transport is completed, the stepping motor is always stopped at a magnetically stable position where either pair of the motor rotors is opposed and attracted to the stator. Accordingly, the frame pitch may be maintained very constant, and the leading edge of the next image may be always placed at the predetermined leading edge position of the frame pitch. Thus, with such the simple driving device, both the film transport and frame edge positioning operations may be carried out effectively.

(Embodiment (2))

Figure 5:
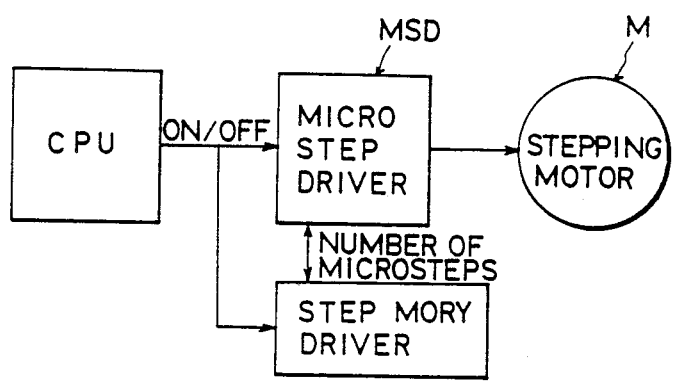
FIG. 5 is a control block diagram illustrating a control scheme for the stepping motor according to a second embodiment of the present invention.

An image forming apparatus according to this second embodiment of the present invention uses a control section including a CPU, a microstep driver and a step memory driver as shown in a control block in FIG. 5. The CPU controls the entire image forming apparatus and operates to energize or de-energize the microstep driver and the step memory driver by transmitting pulse signals thereto in synchronism with a laser irradiation for image information recording. The microstep driver, in response to an ON/OFF signal from the CPU, drives the stepping motor 1 microstep-wise by sub-dividing one step unit of the motor into 1024 microsteps, this microstep driver includes a memory to be described later. The step memory driver, in response to an ON signal from the CPU, causes the microstep driver to effect a drive operation by the number of microsteps stored in the memory. This drive operation by the step memory driver, it is to be noted, is effected after the stepping motor is driven by one step reverse in case the motor was stopped at a step position advanced from that assumed by the motor at the completion of the previous microstep driving operation.

The memory disposed in the microstep driver operates to store the number of microsteps of the microstep driver having driven the stepping motor. More specifically, providing the stepping motor is stopped at a certain step position, this step position as well as the other step positions is sub-divided into 1024 microsteps units by the microsteps driver as described above. Then, the memory stores the number of microstep units within the above step counted from the microstep position first in the order to the microstep position assumed by the motor at the completion of the previous microstep driving operation. This memory preferrably comprises the nonvolatile type or the battery-backed-up type so as to retain its memory contents when the power supply to the entire apparatus is stopped.

When image information is recorded on the film by laser beam irradiation, the stepping motor is driven microstep-wide by receiving via the microstep driver the pulse signals from the CPU, thereby driving the platen roller 31 smoothly. When this image information recording operation is completed, the CPU stops transmitting the pulse signals to the stepping motor via the microstep driver, whereby the stepping motor is de-energized to stop transporting the film 11 through the platen drive roller 31. In the above operations, if the stepping motor stops receiving the pulse signals from the CPU at n microstep position ($0 \leq n \leq 1023$) in the middle of its one step rotation unit sub-divided into 1024 microsteps, the stepping motor comes to a halt only after returning ($n < 512$) or advancing ($n \leq 512$) to stable step position. That is to say, as described in the beginning of this specification the stepping motor, because of its inherent characteristics, is in a magnetically balanced or stable state when either of its rotor pairs is opposed to by the stator as the rotor pair and the stator being magnetically attracted to each other. In other words, such stable position corresponds to each step position of the motor. Thus, if the drive pulse signal transmission to the motor is stopped in the middle of one step, the motor will stop rotating at the angularly closer stable position displaced either clockwise or counterclockwise from the position previously assumed by the motor before the cessation of the signal input. Therefore, when each step is sub-divided into 1024 microsteps as in this embodiment, providing the number of microsteps at the moment of signal input interruption being n, if n is smaller than 512, the stepping motor return by n microsteps. On the other hand, if n is larger than 512, the stepping motor advances by 1024-n to the beginning of the next step position.

Figure 6:
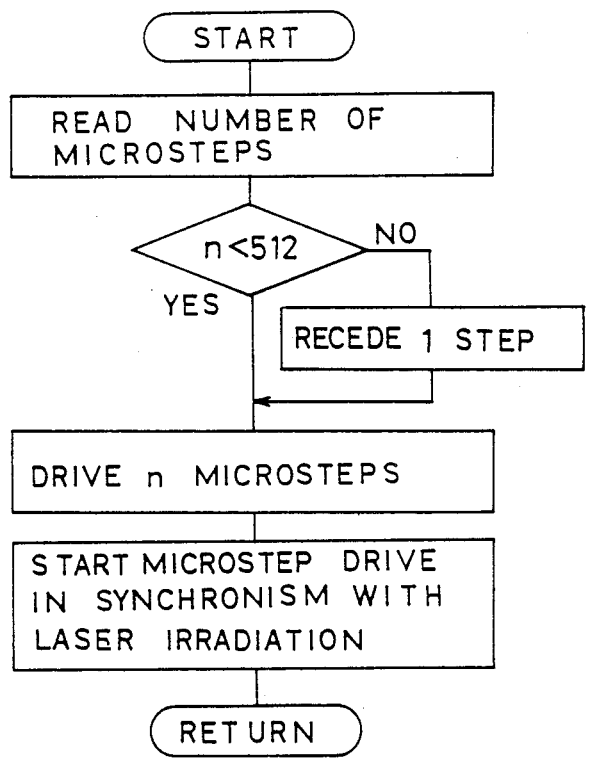
FIG. 6 is a flow chart illustrating the control scheme in FIG. 5 to be executed when the stepping motor is energized.

This number n of microsteps is stored in the memory. Thereafter, when receiving the next ON signal from the CPU, the stepping motor is driven through the microstep driver in accordance with a flow chart shown in FIG. 6. It is to be noted that this flow chart illustrates only the routine immediately related to the present invention, i.e., the routine for setting the frame edge leading position by the stepping motor. With start of this routine, the program reads through the step memory driver the microstep number n stored at the memory of the step memory driver. Then, the program judges whether the value n is smaller than 512. When YES, the step memory driver causes the microstep driver to effect a driving operation dictated by the microsteps of the value n. From this condition, the stepping motor starts a microstep driving operation in synchronism with a laser beam irradiation by the image information recording section 40. Thus, the leading edge of the image to be formed nextly on the film 11 with a subsequent drive of the stepping motor is always set at the predetermined leading edge position of the frame pitch. Then, the film 11 having recorded this image information is discharged and transported with an appropriate slack by the discharge drive rollers 36 and 37, which are driven and controlled by the slack detecting device 8, to proceed to the heat-developing section 50.

(Modified Embodiment 1)

Figure 7:
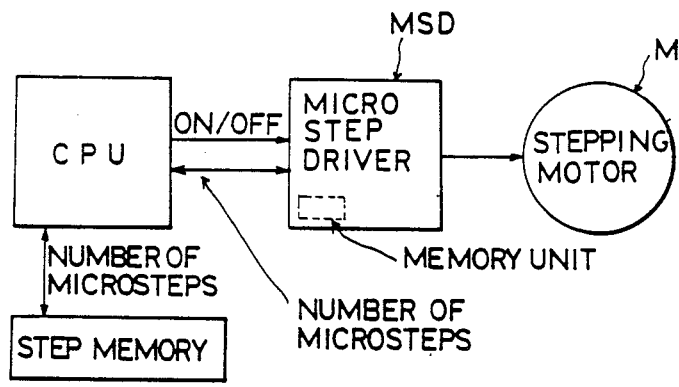
FIG. 7 is a control block diagram illustrating a first modified control scheme alternative to that shown in FIG. 5.

In this modified embodiment related to the second embodiment of the present invention, the number of microsteps is stored in a memory of the CPU in place of the memory of the microstep driver. Referring to a a control block diagram in FIG. 7, in response to an ON/-OFF signal from the CPU, the microstep driver drives the stepping motor microstep-wise. This number of microsteps is stored in a step memory of the CPU. Thereafter, when the CPU again transmits an ON signal to the microstep driver, the microstep driver starts driving the stepping motor after setting the motor to a position corresponding to the position where the previous microstep driving operation was terminated.

The above-described image forming apparatus of this modified embodiment is capable of achieving the same effect as of the previously described second embodiment without providing the dedicated memory driver or the like.

(Modified Embodiment 2)

Figure 8:
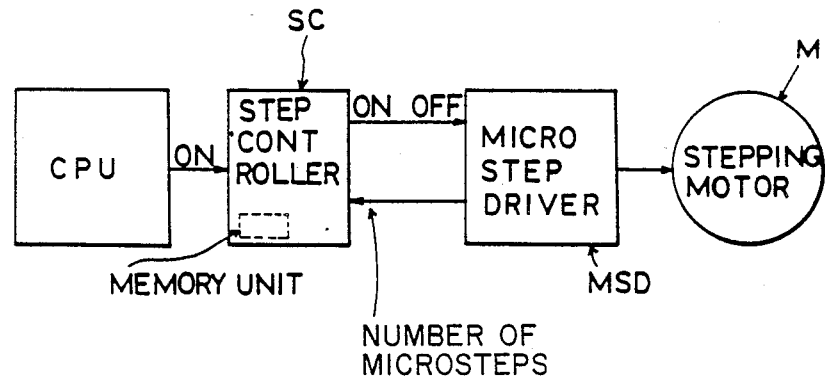
FIG. 8 is a control block diagram illustrating a second modified control scheme alternative to that shown in FIG. 5.
Figure 9:
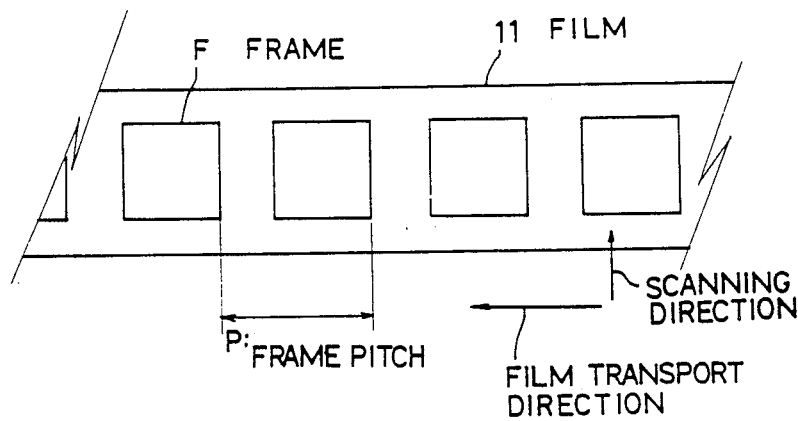
FIG. 9 is a schematic conceptual view illustrating a concept of a frame pitch on a film.
Figure 10:
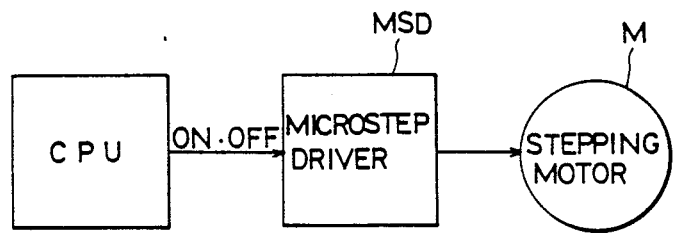
FIG. 10 is a block diagram illustrating a prior art control scheme for the stepping motor.

In this further modified embodiment related also to the second embodiment, the microstep driver is controlled by a step controller having a memory. In this case, as illustrated in a control block diagram in FIG. 8, the microstep driver receives an ON/OFF signal from the CPU through the step controller and then drives the stepping motor microstep-wise. This number of microsteps is stored in the memory of the step controller. Thereafter, when the CPU again transmits an ON signal to the step controller, the step controller carries out a control operation such that the stepping motor is re-energized after the motor is set to a position corresponding to the position where the previous microstep driving operation was stopped.

In the above-described image forming apparatuses according to the second embodiment and its first and second modified embodiments of the present invention, the main drive unit includes the stepping motor driven in terms of a plurality of microsteps constituting a sub-divided step of the motor, the platen roller driven by the stepping motor for transporting the film contacting the outer circumferential face of the roller, the memory for storing the number of microsteps provided by the stepping motor and representative of the film transport distance provided by the main driver roller, and the control section for effecting a control operation based on the stored contents in the memory such that the next driving operation of the stepping motor is started after the motor is set to the position where the previous microstep driving operation was stopped.

Consequently, even if an image forming operation on the film is stopped in the middle of one step unit of the stepping motor, the next image forming operation is started with the leading edge of the image to be formed next being returned to the position previously assumed by the motor at the completion of foregoing driving operation. Therefore, the leading edge of the image to be formed next is always set to the predetermined leading edge position of the next frame pitch. As a result, the adjacent images to be formed in series on the film will not overlap with each other in the transport direction of the film. As described above, according to the present invention, the film transport operation and the positioning operation of the leading edge of the image to be formed on the film may be effectively carried out by a single drive unit having such simple construction as described above.

What is claimed is:

1. An image forming apparatus for forming in series a plurality of images on a photosensitive film of the long roll type comprising:
   feeding means for feeding the film;
   discharging means for discharging an image-recorded film;
   transporting means interposed between said feeding means and said discharging means for transporting the film from said feeding means to said discharging means;
   a stepping motor for driving said transporting means;
   a microstep driver for controllably driving said stepping motor in a plurality of microsteps constituting one step unit of said stepping motor;
   imaging means for scanning and exposing the film being transported by said transporting means in a direction normal to a film transporting direction;
   wherein a pitch between adjacent images to be formed in series on the film is a multiple of an integer of a film transport distance covered by the single step unit of said stepping motor;
   said transporting means includes a platen roller driven and rotated by said stepping motor, said platen roller having a diameter predetermined to be of a multiple of an integer value of said film transport distance covered by one step unit of said stepping motor; and
   wherein said platen roller is mounted on a drive shaft of said stepping motor, said diameter: R of the platen roller, said pitch: P of the adjacent images to be formed in series on the film being represented by the following expression:

$$R = (1/N) \times (P/\pi) \times (360/A)$$

where N is an integer value and A is a step angle of said stepping motor.

2. An image forming apparatus for forming in series a plurality of images on a photosensitive film of the long roll type comprising:
   feeding means for feeding the film;
   discharging means for discharging an image-recorded film;
   transporting means interposed between said feeding means and said discharging means for transporting the film from said feeding means to said discharging means;
   a stepping motor for driving said transporting means;
   a microstep driver for controllably driving said stepping motor in a plurality of microsteps constituting one step unit of said stepping motor;
   imaging means for scanning and exposing the film being transported by said transporting mean in a direction normal to a film transporting direction whereby when an imaging operation is completed, a stop position for said stepping motor is determined; and
   initial control means for re-setting said stepping motor to said stop position determined at the completion of the immediately preceding imaging operation before re-energizing said stepping motor for a next imaging operation.

3. An image forming apparatus, as defined in claim 2, further comprising:
   memory means for storing a number of microsteps corresponding to a film transport distance provided by said platen roller;
   wherein said initial control means executes an initial control operation on said stepping motor in accordance with said number of microsteps stored in said memory means.

4. An image forming apparatus, as defined in claim 2, wherein said microstep driver supplies a current to said stepping motor for the microstep drive of the stepping motor such that changes in the supplied current are phased in over a predetermined period of time.

* * * * *